United States Patent [19]

Johnson et al.

[11] Patent Number: 4,732,361
[45] Date of Patent: Mar. 22, 1988

[54] HIGH PRESSURE LUBRICANT CONTROL VALVE WITH SELF-CLEANING RESTRICTOR

[75] Inventors: Myron J. Johnson, Arlington Heights; Mark C. C. Kao, Elmhurst, both of Ill.

[73] Assignee: Stewart-Warner Corporation, Chicago, Ill.

[21] Appl. No.: 424,085

[22] Filed: Sep. 27, 1982

[51] Int. Cl.⁴ .............................................. F16K 21/00
[52] U.S. Cl. ..................................... 251/120; 138/44
[58] Field of Search ............................... 251/120, 118; 137/245.5, 244, 512.5, 517; 138/44, 45; 184/105 A, 105 C; 222/496, 564

[56] References Cited

U.S. PATENT DOCUMENTS 2,729,369  1/1956  Chinchole ........................... 222/496

FOREIGN PATENT DOCUMENTS 1285534  8/1972  United Kingdom ................ 137/517

Primary Examiner—Alan Cohan
Attorney, Agent, or Firm—Lorusso & Loud

[57] ABSTRACT

A self-cleaning restrictor assembly for a high pressure lubricant valve that minimizes the effect of accidental discharge by reducing no load outlet flow. The restrictor assembly has a pair of restrictors that are alternately opened and closed to provide a constant restricted flow area while easily passing any foreign material.

17 Claims, 4 Drawing Figures

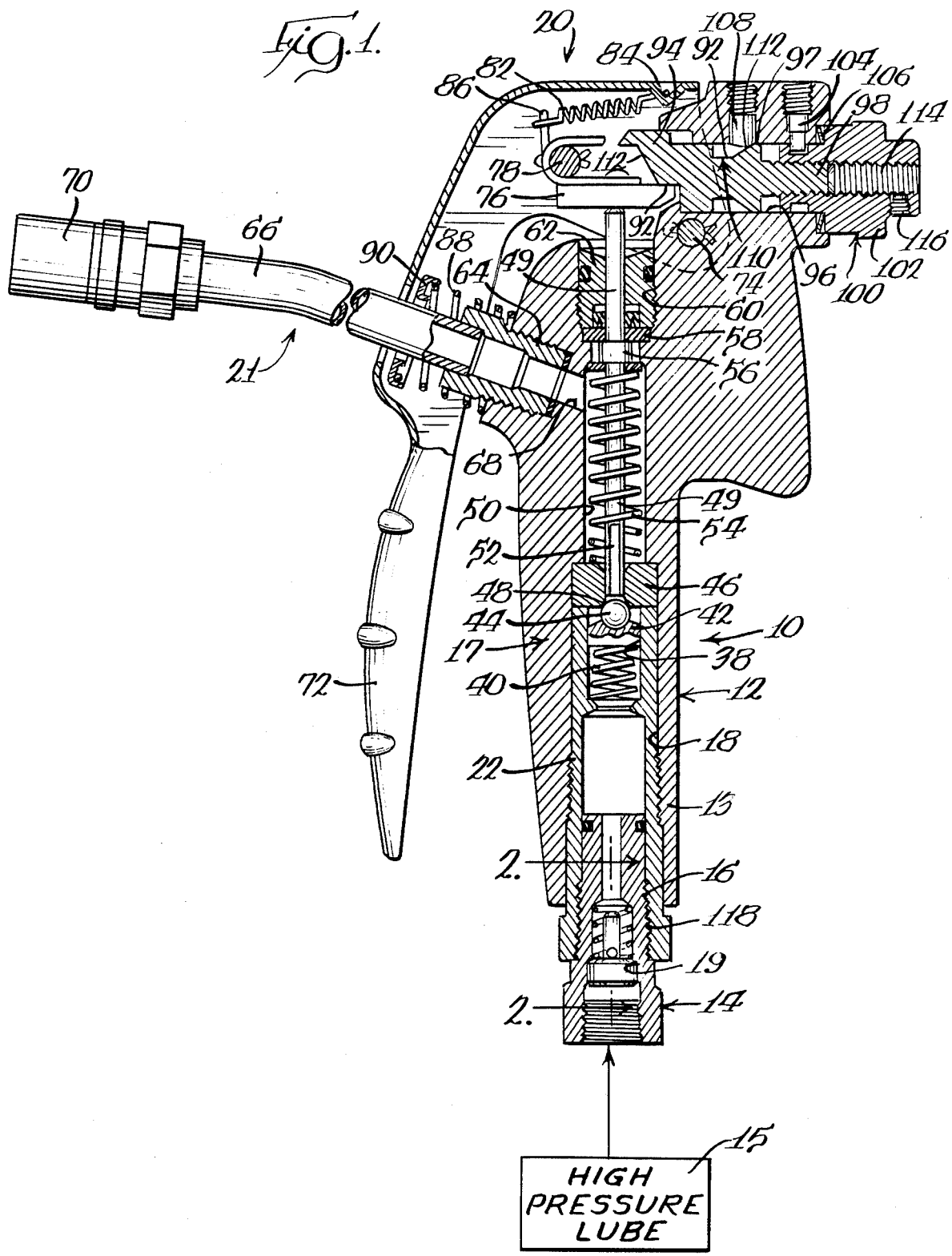

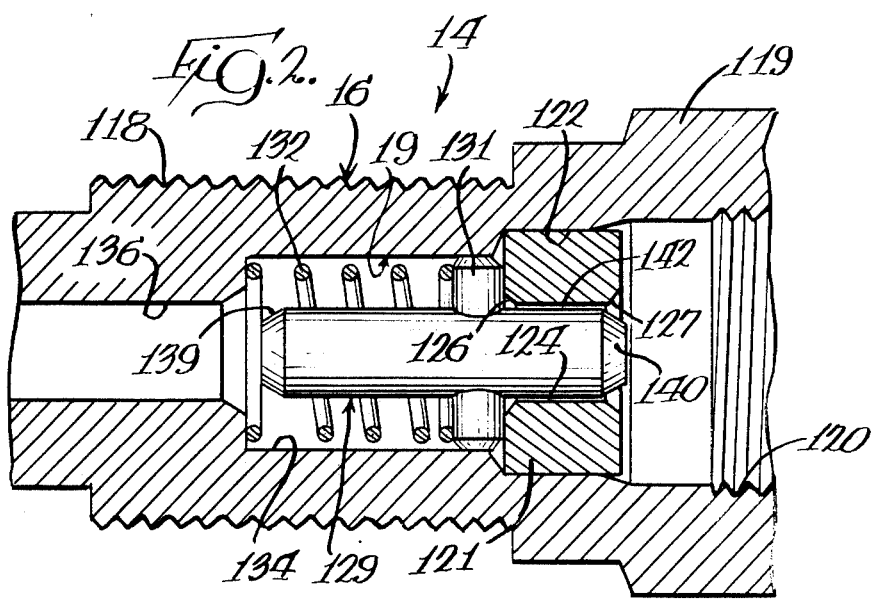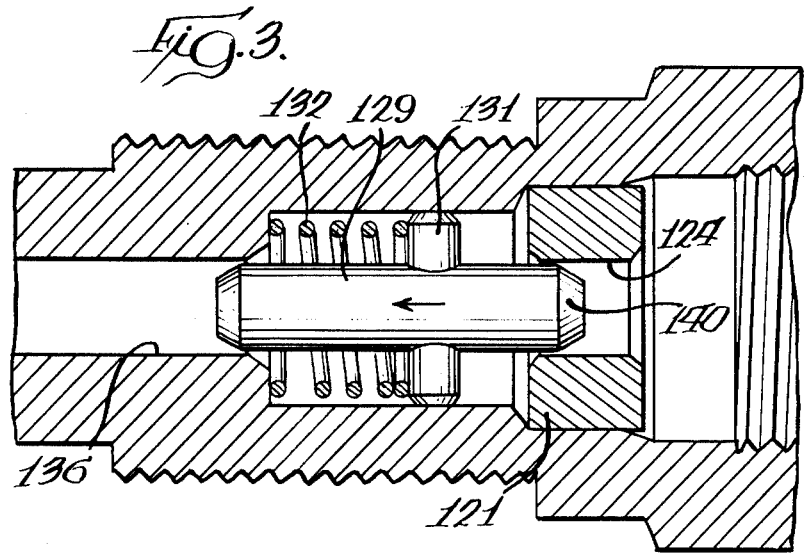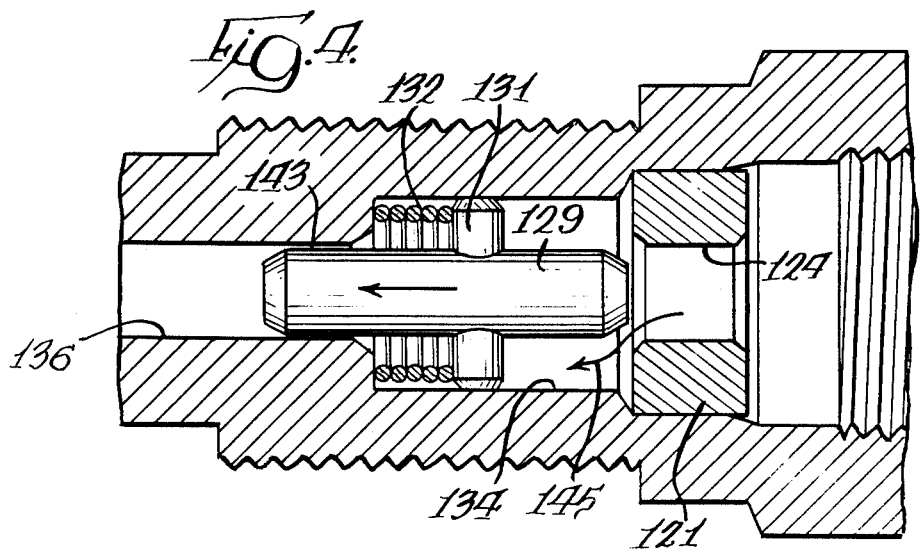

HIGH PRESSURE LUBRICANT CONTROL VALVE WITH SELF-CLEANING RESTRICTOR

BACKGROUND OF THE INVENTION

Many different types of control valves have been provided in the past for controlling the flow of high pressure lubricant to machinery bearings through lubrication fittings. One type of control valve, sometimes referred to as a lubricant gun, includes a hand-held valve assembly that delivers a quantity of high pressure lubricant through an outlet extension tube having a coupler at the end thereof adapted to releasably fit over a lubrication fitting associated with the machine being lubricated.

These fittings are short male members with beveled ends to facilitate the location of the coupler. The coupler is a female fitting fixed to the gun's extension tube, and usually has a socket that receives and conforms in shape to the fittings so the coupler is sealed to the fitting during lubrication.

Automobiles are exemplary of machines that have this type of fittings for the chassis and wheel assembly bearings that require periodic lubrication. Because of the high viscosity of the lubricant and because of the presence of foreign material in the fittings and bearings to be lubricated, extremely high lubricant source pressure on the order of 2,000 PSI is required. In some cases, pressures as high as 9,000 PSI are encountered. If the operator inadvertently actuates the control valve when the extension coupler is not properly seated on the lubrication fitting, lubricant discharges from the coupler extension at a high velocity presenting a very serious danger to personnel in the area because it can readily penetrate human tissue.

To obviate or minimize this problem it has been proposed in the past that a restrictor be provided in the control valve outlet extension to reduce the flow rate from the coupler when the coupler is not properly positioned. This restrictor is disclosed and claimed in the co-pending Application of Joseph M. Stomper entitled "High Pressure Control Valve" Ser. No. 689,673, filed May 24, 1976, now abandoned, assigned to the assignee of the present invention. With this orifice or restrictor, the high velocity lubricant passing through the restrictor orifice when the coupling is not connected to a fitting dissipates in the extension tube and lubricant discharges from the coupler at a relatively low velocity, harmless to human tissue. While this restrictor is acceptable for many applications, it has been found that the restrictor tends to clog when using a source lubricant having entrained foreign material. In such cases the user will frequently simply remove the restrictor to eliminate the clogging problem and then obviously the control valve resumes the capability of high velocity inadvertent discharge.

It is a primary object of the present invention to ameliorate the problem noted above in the prior art and provide a high pressure control valve restrictor assembly that is self-cleaning.

SUMMARY OF THE PRESENT INVENTION

According to the present invention a self-cleaning restrictor assembly is provided for a high pressure lubricant control valve, sometimes referred to as a lubricant gun, that achieves a constant flow area with a pair of restrictors that are alternately opened and closed, easily passing foreign material and thereby preventing clogging.

The control valve includes a hand-held housing with an inlet fitting adapted to be connected through a flexible high pressure hose to a source of high viscosity lubricant under pressure which is usually provided by a tank and compressor combination. A stem operated ball valve is mounted within the housing and is actuated by a pivotally mounted handle through a fulcrum and latch bar mechanism. The fulcrum and latch bar mechanism is adjustable to provide either continuous flow upon depression of the handle or alternatively to provide a measured shot or quantity of lubricant. Lubricant passing through the open ball valve passes through a valve housing outlet to an extension tube with a coupler on the end thereof adapted to fit over conventional lubrication fittings or "nipples".

The restrictor assembly according to the present invention is mounted within the inlet fitting carried by the control valve housing. While the restrictor may also be mounted elsewhere within the system, it is preferably located in the control valve inlet fitting for convenience and lower cost. The restrictor may then be more universally applied to other variations of designs for the control valve and marketed as an accessory item to retrofit control valves of previous manufacture and sale.

The restrictor includes an externally threaded housing that forms a part of the control valve inlet. The housing has a plurality of stepped bore portions therein. An annular ring is pressed in an outer enlarged portion of this stepped bore and has a through bore therein that defines a first upstream orifice for the restrictor assembly. The stepped housing bore has a reduced diameter portion at its outlet and equal in diameter to the bore in the pressed ring, and it defines a second downstream orifice for the restrictor assembly An intermediate portion of the stepped bore between the two spaced orifices defines a chamber in which a spring biased piston is mounted for axial sliding movement. This piston is a constant diameter rod having opposite ends that slide into and out of the first and second orifices, and it defines with these orifices first and second restrictors for fluid flowing therethrough. The piston ends have equal diameters 0.004 to 0.008 inches less than the diameter of the cooperating orifices in the pressed ring and the reduced housing bore to provide annular clearances that are the effective restricted flow passages for the first and second restrictors.

The piston carries a transversely mounted pin that defines a stop for the piston when in engagement with the pressed ring and also serves as a spring seat for a coil compression spring in the intermediate chamber that biases the piston in an upstream direction toward the pressed ring.

These first and second orifices defined in the restrictor assembly housing are spaced sufficiently with respect to the length of the piston so that when the piston is at its extreme upstream position with the stop in engagement with the pressed ring and one end of the piston is fully entered into the orifice in the pressed ring, the downstream end of the piston will be spaced considerably from the second or downstream orifice in the housing to provide unrestricted flow therethrough. The piston is essentially a flow responsive member in that it moves in response to fluid flow from its upstream position to its extreme downstream position where it enters the downstream orifice until it stops upon fully compressing the coil compression return spring.

When the control valve lever is in its inoperative, released position, blocking flow through the valve, the piston is in its upstream position restricting the orifice in the pressed ring, which is as explained above the upstream orifice, and opening the downstream orifice. Upon depression of the control valve operating lever, the main control valve will open beginning the flow of lubricant through the control valve. Lubricant then begins flowing through the upstream restricted orifice and flow impinging upon the upstream end of the piston causes the piston to move in a downstream direction compressing its coil compression return spring. At this time any foreign material in the intermediate chamber may pass freely through the open downstream orifice. After the piston moves a short distance, the downstream end thereof enters the downstream orifice restricting that orifice prior to the time the upstream end of the piston leaves the upstream orifice in the pressed ring so that a restricted flow area is present in all positions of the piston. Upon further movement of the piston in a downstream direction, and as lubricant continues to discharge through the control valve, the upstream end of the piston will leave and open the orifice in the pressed ring permitting any foreign material in the ring orifice or on the upstream end of the piston to become dislodged and enter the intermediate chamber between the two orifices. Thereafter only the downstream restrictor provides the desired flow restricting function.

Upon release of the control valve operating lever, or upon closure of the control valve by a measured shot or measured quantity fulcrum and latch mechanism in the control valve, flow through the control valve will cease and the coil return spring will move the piston back to its extreme upstream position with its stop engaging the pressed ring. During this movement the downstream end of the piston opens the downstream orifice dislodging any foreign material in that orifice or on the downstream end of the piston. When the control valve is again actuated any foreign material in the intermediate chamber dislodged from the upstream orifice in the pressed ring will pass freely through the open downstream orifice. It should be understood that the movement of the piston between its extreme positions occurs rapidly, within a fraction of a second.

It can thus be seen that the present restrictor assembly provides a constant reduced flow area throughout its range of movement by alternately opening and closing the spaced restrictors, and the opening and closing movement of the restrictors assures that they will be free from clogging and contamination by foreign material, and that any foreign material cleaned away can pass freely through the restrictor assembly without affecting its performance.

BRIEF DESCRIPTION OF THE DRAWINGS

FIG. 1 is a longitudinal section through a control valve illustrating a restrictor assembly according to the present invention mounted at the control valve inlet;

FIG. 2 is an enlarged longitudinal section of the restrictor assembly according to the present invention with its piston restricting the upstream orifice;

FIG. 3 is an enlarged longitudinal section of the restrictor assembly similar to FIG. 2 with the piston in an intermediate position; and, FIG. 4 is an enlarged longitudinal section of the restrictor assembly similar to FIGS. 2 and 3 with the piston in its extreme downstream position restricting the downstream orifice.

DETAILED DESCRIPTION OF THE PREFERRED EMBODIMENT

Referring to the drawings and particularly FIG. 1, a control valve 10 is illustrated according to the present invention generally including an elongated housing 12 with an inlet restrictor assembly 14, a control valve assembly 17 operated by a control lever 72 and a measured quantity latch bar and fulcrum mechanism 20, and a discharge assembly 21.

The control valve housing 12 has a downwardly projecting handle or grip portion 13 and the restrictor assembly 14 is mounted in the handle or grip portion 13 of the housing and defines an inlet fitting for receiving lubricant under pressure from high pressure source 15. High pressure source 15 is a tank and compressor assembly capable of delivering high viscosity lubricant under pressures in excess of 2,000 pounds per square inch and such units are readily commercially available at the present time.

The restrictor assembly 14 has a stepped bore 19 in an inlet housing or fitting 16 that communicates the inlet to a bore 38 in an inlet bushing 22 threaded into an enlarged bore 18 in the lower grip portion 13 of the control valve housing 12. Bushing 22 threadedly receives the restrictor assembly fitting or housing 16.

Bushing bore 38 houses a valve spring 40 compressed between the lower end of bore 38 and a ball carrier 42. The ball carrier 42 may be square or polygonal to permit free passage of lubricant around the carrier through the bore 38.

A valve member in the form of a spherical ball 44 is carried on the upper cooperating surface of the ball carrier 42. Ball valve 44 is urged upwardly by the spring 40 toward a bushing 46 having a downwardly facing valve seat 48.

The lower end of a flow control plunger or valve operating stem 49 extends downwardly through a bore passageway 50 in the valve housing 12 into the bushing 46 above the ball 44. The stem 49 has a flat surface 52 to permit lubricant to flow through the bushing 46 along the lower end of the stem. There may be a slight clearance between the ball 44 and the lower end of the plunger in the position shown in FIG. 1 to assure accurate seating of the ball.

A coil compression spring 54 positioned in the bore 50 is compressed between the upper surface of the bushing 46 and a washer engaging the lower end of an enlarged annular abutment 56 on the plunger. The upward movement of the plunger 49 is limited by engagement of the upper end of the abutment 56 with a washer 58 retained in the bore 60 by means of a suitably packed bushing 62 threaded into the bore 60. The upper end of the plunger 49 extends upwardly through the bushing 62.

An outlet extension 66 is threadedly received in an outlet bushing 64 threaded into an inclined outlet passage 68 in housing 12 communicating with main housing bore 50. The outlet extension 66 carries a conventional coupler 70 at the distal end thereof for releasably connecting the control valve discharge to conventional lubrication fittings carried by the device to be lubricated, A spring 88 coiled around the outlet extension and bushing 64 is compressed between the valve housing 12 and a retainer cup 90 engaging operating lever 72.

Spring 88 urges the operating lever to its inactive position illustrated in FIG. 1.

The valve operating lever 72 is generally U-shaped in cross-section and is connected to the valve housing 12 by a pivot pin 74 extending transversely through the upper end of the valve body immediately to the rear and at the upper end of bore 60.

A latching bar or rocker bar 76 is connected with the operating lever 72 by means of a transverse pivot pin 78. A U-shaped bracket 80 is secured to the upper surface of the latching bar 76 and is hooked around the front of the pivot 78 to form an elongated guide for the latching bar pivot. The outer curved end of the bracket 80 forms an abutment which is engaged by the pivot 78 during opening movement of the operating lever. A coil compression spring 82, hooked between a spring ear 84 on the operating lever and an upwardly extending lug 86 on the U-bracket 80, urges the bracket 80 rearwardly. The spring 82 tends to rotate the bracket clockwise and urges the latching bar 76 into engagement with the upper end of the control stem 49.

The upper edge of the latching bar 76 normally engages a horizontal anchor ledge surface 92 on an adjustable fulcrum member 94. The rear portion of the fulcrum member 94 is slideably positioned in a horizontal bore 96 extending through an upper portion of the valve housing 12. This fulcrum has a flat upper surface 97 which engages complementary surface in the valve housing 12 to prevent rotation of the fulcrum 94 in bore 96. A stem 98 extends from the rear of fulcrum 94 and is threadedly received in a bore in an adjusting screw 100 rotatably mounted in the end of bore 96. Screw 100 is restricted against axial movement by a pin 104 that extends into an annular groove in the adjusting screw. A spring washer 106 is positioned between an enlarged head portion 102 of the adjusting screw 100 and the valve housing 12 to provide frictional resistance to rotation of the screw.

An axial set screw 114 extends through the screw 100 and provides an adjustable rear stop which is engageable with the fulcrum stem 98, and it is maintained in its adjusted position by a locking screw 116. A set screw 108 limits sliding movement of the fulcrum 94 in the bore 96 by engaging the opposite ends of external groove 110 on the fulcrum.

The fulcrum has a diagonal guide surface 112 which slopes upwardly and forwardly from horizontal surface 92.

When the operating lever 72 is pulled rearwardly against the force of spring 88, the pivot 78 which carries the latching bar 76 moves arcuately forwardly and downwardly. The front end of the latching bar 76 moves downwardly with the pivot 78, but the rear upper edge of the latching bar fulcrums on the horizontal fulcrum surface 92. Consequently, the latching bar 76 forces the plunger or stem 49 downwardly against the resistance of spring 54 into engagement with ball valve 44.

The force exerted on the lower face of ball 44 by the high pressure lubricant in the inlet conduit or bore 38 provides considerable resistance to unseating the ball so that a relatively high force is required to open the valve. When the valve ball 44 is unseated by stem 49, inlet pressure is applied to all sides of the valve and the net upward force on the valve is greatly reduced. Therefore, the ball valve 44 opens rapidly and the operating lever 72 moves to its extreme counter-clockwise position (not shown in the drawings) from its inactive position illustrated in FIG. 1 with a sudden snap. Lubricant then flows around ball 44 through bore 50 and the outlet passage 68, and through the outlet conduit 66 and coupler 70.

In FIG. 1, the fulcrum 94 is adjusted to its forward extreme position. This position of the fulcrum provides continuous flow of lubricant upon actuation of the lever 72 and flow continues as long as the lever remains depressed. Foward movement of the pin 78 draws the latching bar forwardly on the surface 92, but the movement is insufficient to disengage bar 76 from surface 92.

When a measured charge of lubricant is desired to be delivered in response to each operation of the operating lever 72, the fulcrum 94 is moved rearwardly by turning the adjusting screw 100. With the fulcrum 94 in a retracted position (not shown in the drawings), the right edge of the latch bar 76 is still in engagement with horizontal surface 92 but is closer to inclined surface 112 on the fulcrum. In this position of the fulcrum 94, when the operating lever 72 is depressed the ball valve 44 is opened and latching bar 76 is pulled forwardly so that it disengages horizontal fulcrum surface 94. The upward movement of operating stem 49 permits the ball valve to seat and shut off the flow of lubricant through the control valve. Spring 82 urges the latching bar 76 downwardly against the top of plunger 49 but the strength of spring 82 is insufficient to move the operating stem 49.

When the operating lever 72 is released, spring 82 forces the rear upper edge of the latching bar 76 downwardly and rearwardly along inclined surface 112. During this movement the pin 78 may move a short distance rearwardly with respect to the U-shaped bracket 80. When the operating lever 72 is fully returned to its normal position illustrated in FIG. 1, the spring 82 slides the rear upper edge of latching bar 76 rearwardly under the horizontal fulcrum surface 92 so that the latching bar resumes its starting position.

The size of a single charge of lubricant delivered by the control valve may be adjusted by changing the axial position of fulcrum 94 in bore 96. When the fulcrum is moved to its rear extreme position the smallest charge will be delivered and by adjusting the fulcrum forwardly the size of the charge is increased because the latching bar 76 moves farther in relation to movement of the operating lever 72 before disengaging the fulcrum surface 92.

The restrictor assembly 14 provides a continuous constant flow area restrictor for the present control valve 10 in both the continuous discharge and measured quantity modes of operation. As described above, the restrictor assembly 14 functions to reduce discharge flow from the coupler 70 in the event the operator actuates lever 72 without the coupler being properly seated over a lubrication fitting. The reduced flow area provided by the restrictor 14 does not significantly reduce outlet flow from the coupler 70 when the coupler is properly positioned over a lubrication fitting because the flow rates required for this type of lubrication are relatively low so that the pressure drop across the restrictor 14 is relatively small and the control valve essentially delivers lubricant at full source pressure. However, when the coupler 70 is not properly positioned and the operating lever 72 is depressed the restrictor assembly 14 reduces the flow rate through the control valve (compared to flow rates without the restrictor) to such an extent that the high pressure lubricant is dissipated in the control valve itself and discharges harmlessly from the coupler 70.

As seen more clearly in FIGS. 2, 3 and 4, the restrictor assembly housing 16 has a threaded portion 118, which as seen in FIG. 1 is threaded into bushing 22, and an enlarged hexagonal head portion 119. The stepped bore 19 in housing 16 has an enlarged threaded inlet portion 120 that is adapted to receive a hose fitting of a hose extending to the high pressure lubricant source 15.

An annular ring 121 is pressed into enlarged portion 122 of stepped bore 19 and has a central through bore 124 therein with chamfered ends 126 and 127. Bore 124 forms an orifice for an upstream restrictor in the restrictor assembly 14.

A piston 129 is slideable in the stepped bore 19 and has a transverse cross pin 131 pressed through a transverse bore therein. A coil compression spring is seated in intermediate bore portion 134 and reacts against pin 131 urging it toward engagement with the ring 121 in the extreme upstream position of piston 129 illustrated in FIG. 2. Pin 131 thus defines a stop for the piston 129 as well as a seat for coil compression spring 132.

The stepped bore 19 in the restrictor housing 16 has a reduced diameter downstream bore portion 136 that defines a second orifice in the restrictor. Orifice 136 has a diameter equal to orifice 124 and they are spaced apart a distance less than the length of the piston 129. Piston 129 has a constant diameter throughout its length and chamfered downstream and upstream ends 139 and 140. The diameter of piston 129 is 0.004 to 0.008 inches less than the diameter of the orfices 124 and 136 so that as the piston enters the orifices the annular clearances 142 (FIG. 2) and 143 (FIG. 4) define annular restricted flow areas for lubricant passing through the restrictor assembly 14.

The position and size of the piston 129 and its chamfered upstream end 140, together with the low spring rate of spring 132, render the piston responsive to flow through the restrictor. Thus, as the control valve 17 is opened by depression of the operating lever 72, piston 129 will move rapidly toward the left or in a downstream direction depressing coil compression spring 132. Prior to the time that the upstream end of the piston 129 leaves the orifice 124, the downstream end of the piston will enter the downstream orifice 136. In this position of the piston 129 both the upstream orifice 124 and the downstream orifice 136 are restricted so that at no time are both the upstream and downstream restrictors open.

Upon further movement of piston 129 in a downstream direction from its position shown in FIG. 2 in response to continued lubricant flow through stepped bore 19, the upstream end of the piston will leave the orifice 124 and the piston will reach its extreme downstream position where stop 131 fully compresses spring 132 as seen in FIG. 4. This opening of the orifice 124 permits any foreign material therein to freely pass into intermediate bore portion 134 as indicated by arrow 145 in FIG. 4.

When the operator closes ball valve 144, or the ball valve is closed by the latch bar and fulcrum mechanism 20 after a measured quantity has been delivered, flow will cease through the restrictor assembly 13 and since piston 129 is flow responsive it will return to its upstream position illustrated in FIG. 2 under the biasing force of spring 132. During this movement of the piston, the downstream end of the piston will move out of the orifice 136, opening that orifice, dislodging any foreign material therein. Upon the next actuation of the control valve 17, any foreign material in the intermediate bore chamber 134 may freely pass through the open orifice 136 as the piston begins its downstream movement from its FIG. 2 position.

Piston 129 moves back and forth once during each cycle of operation of the control valve 17, and this reciprocating action of the piston ends in the orifices 124 and 136 keeps the orifices free of foreign material and prevents clogging.

We claim:

1. A high pressure lubricant control valve, comprising; a valve body having an inlet, an outlet extension with a coupler at the end thereof adapted to releasably fit against a lubrication fitting on the part to be lubricated, a fluid passage extending through and between the inlet, the valve body and the extension, a control valve in the valve body controlling fluid flow between the inlet and the outlet extension, and restrictor means including a restrictor in the fluid passage for reducing the outlet flow from the extension coupler under no load conditions when the coupler is not fitted against a lubrication fitting, said restrictor means including means for periodically and automatically passing foreign material around the restrictor.

2. A high pressure lubricant control valve, comprising; a valve body having an inlet, an outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet and the outlet extension, and restrictor means separate from the control valve in the fluid passage for providing a reduced constant flow area in the fluid passage that is constant regardless of control valve position, and means for passing foreign material through the restrictor means without varying the flow area thereof.

3. A high pressure lubricant control valve, comprising; a valve body having an inlet, an outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet and the outlet extension, and restrictor means including a restrictor in the fluid passage for reducing the outlet flow from the extension coupler under no load conditions when the coupler is not fitted against a lubrication fitting, said restrictor means including means for periodically and automatically passing foreign material through the restrictor.

4. A high pressure lubricant control valve, comprising; a valve body having an inlet, an outlet extension, with a coupler in the end thereof adapted to releasably fit against a lubrication fitting on the part to be lubricated, a fluid passage extending through and between the inlet, the valve body and the extension, a control valve in the valve body controlling fluid flow between the inlet and the outlet extension, and constant flow area restrictor means in the fluid passage separate from the control valve for reducing flow from the coupler under no load conditions, said restrictor means including a flow restricting orifice, and a member movable into and out of the orifice to prevent clogging without varying the flow area of the restrictor means.

5. A high pressure lubricant control valve, comprising; a valve body an inlet, an outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet and the outlet extension constant flow area restrictor means in the fluid passage separate from the control valve for reducing fluid flow from the coupler under no load conditions, said restrictor means including an orifice, a piston in the orifice that defines a generally annular restricted flow area, and means for moving the piston to minimize clogging of the restrictor means without varying the flow area of the restrictor means.

6. A high pressure lubricant control valve, comprising; a valve body having an inlet, and outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet and the outlet extension, and constant flow area restrictor means in the fluid passage separate from the control valve for reducing fluid flow from the coupler under no load conditions, said restrictor means including an orifice, a piston in the orifice that defines a generally annular restricted flow area, and means for moving the piston to minimize clogging of the restrictor means without varying the flow area of the restrictor means, said piston being responsive to fluid flow in the fluid passage for enlarging the orifice to pass foreign material therethrough.

7. A high pressure lubricant control valve, comprising; a valve body having an inlet, an outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet and the outlet extension and constant flow area restrictor means in the fluid passage separate from the control valve for reducing fluid flow from the coupler under no load conditions, said (resistor) restrictor means including an orifice, a piston in the orifice that defines a generally annular restricted flow area, said piston being spaced from the orifice when the control valve is closed and being responsive to fluid flow in the fluid passage to move into the orifice to define a generally annular restricted flow area therewith without varying the flow area of the restrictor means.

8. A high pressure lubricant control valve, comprising; a valve body having an inlet, an outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet and the outlet extension, oonstant flow area restrictor means in the fluid passage separate from the control valve for limiting flow from the coupler under no load conditions when the coupler is not properly positioned, said restrictor means including first and second spaced restrictors in the fluid passage, and means for (selectively opening and closing) automatically alternately enlarging the first and second restrictors to minimize clogging of the fluid passage.

9. A high pressure lubricant control valve, comprising, a valve body having an inlet, an outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet, the valve body and the extension, constant flow area restrictor means in the fluid passage separate from the control valve for limiting flow from the coupler under no load conditions when the coupler is not properly positioned, said restrictor means including first and second spaced restrictors in the fluid passage, said first and second spaced restrictors having substantially equal restricted flow areas, means for automatically enlarging the first restrictor while the second restrictor is in a normal restricted condition to pass foreign material through the first restrictor, and means for automatically enlarging the second restrictor while the first restrictor is in a normal restricted condition, whereby a constant restricted flow area is achieved without clogging the fluid passage.

10. A high pressure lubricant control valve comprising; a valve body having an inlet, an outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet, the valve body and extension, restrictor means in the fluid passage for limiting flow from the coupler under no load conditions when the coupler is not properly positioned, said restrictor means including first and second spaced restrictors in the fluid passage, said first and second spaced restrictors having substantially equal restricted flow areas, means for opening the first restrictor while the second restrictor is in a restricted condition to pass foreign material through the first restrictor, means for opening the second restrictor while the first restrictor is in a restricted condition, whereby a constant restricted flow area is achieved without clogging the fluid passage, the first and second restrictors including a pair of spaced orifices, and an axially slideable piston in the orifices movable between a first position restricting the first orifice and opening the second orifice and a second position restricting the second orifice and opening the first orifice.

11. A high pressure lubricant control valve, as defined in claim 10, wherein the piston is responsive to fluid flow in the fluid passage to move from the first position to the second position as the control valve is opened and to return to the first position when the control valve is closed.

12. A high pressure lubricant control valve, as defined in claim 10, including a spring biasing said piston to said first position.

13. A high pressure lubricant control valve, as defined in claim 10, wherein the first and second orifices have identical diameters, said piston having opposite ends of the same diameter slightly less than the diameter of the orifices, each slideable into one of the orifices.

14. A high pressure lubricant control valve, comprising; a valve body having an inlet, an outlet extension with a coupler in the end thereof adapted to releasably fit against a lubrication fitting on the part to be lubricated, a fluid passage extending through and between the inlet, the valve body and the extension, a control valve in the valve body controlling fluid flow between the inlet and the outlet extension, restrictor means in the fluid passage for limiting flow from the coupler under no load conditions when the coupler is not properly positioned, said resistor means including first and second spaced restrictors in the fluid passage, said first and second restrictors having substantially equal restricted flow areas, means for opening the first restrictor while the second restrictor is in a restricted condition to pass foreign material through the first restrictor, means for opening the second restrictor while the first restrictor is in a restricted condition, whereby a constant restricted flow area is achieved without clogging the fluid passage, said first and second restrictors including a pair of spaced orifices, an axially slideable piston in the orifices movable between a first position restricting the first orifice and opening the second orifice and a second position restricting the second orifice and opening the first orifice, the first and second orifices have identical diameters, said piston having opposite ends of the same diameter slightly less than the diameter of the orifices each slideable into one of the orifices, and spring means biasing said piston to said first position.

15. A self-cleaning restrictor for a fluid flow passage, comprising; restrictor means including first and second restrictors, said first and second restrictors having substantially equal restricted flow areas, means for opening the first restrictor while the second restrictor is in a restricted condition to pass foreign material through the first restrictor, means for opening the second restrictor while the first restrictor is in a restricted condition, whereby a constant restricted flow area is achieved without clogging the fluid passage, said first and second restrictors including a pair of spaced orifices and an axially slideable piston in the orifices movable between a first position restricting the first orifice and opening the second orifice and a second position restricting the second orifice and opening the first orifice.

16. A self-cleaning restrictor for a fluid flow passage, as defined in claim 15, wherein the first and second orifices have identical diameters, said piston having opposite ends of the same diameter slightly less than the diameter of the orifices each slideable into one of the orifices.

17. A self-cleaning restrictor for a fluid flow passage, comprising; restrictor means including first and second restrictors, said first and second restrictors having substantially equal restricted flow areas, means for opening the first restrictor while the second restrictor is in a restricted condition to pass foreign material through the first restrictor, means for opening the second restrictor while the first restrictor is in a restricted condition, whereby a constant restricted flow area is achieved without clogging the fluid passage, said first and second restrictors including a pair of spaced orifices, an axially slideable piston in the orifices movable between a first position restricting the first orifice and opening the second orifice and a second position restricting the second orifice and opening the first orifice, said first and second orifices having identical diameters, said piston having opposite ends of the same diameter slightly less than the diameter of the orifices each slideable into one of the orifices, and spring means biasing said piston to said first position.

* * * * *